United States Patent
Saito (10) Patent No.: US 10,168,176 B2
(45) Date of Patent: Jan. 1, 2019

(54) VISUALIZING UNIDIRECTIONAL TRAFFIC INFORMATION

(71) Applicant: INTERNATIONAL BUSINESS MACHINES CORPORATION, Armonk, NY (US)

(72) Inventor: Shin Saito, Sagamihara (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/450,432

(22) Filed: Mar. 6, 2017

(65) Prior Publication Data

US 2018/0252548 A1  Sep. 6, 2018

(51) Int. Cl.
| | | |
|---|---|---|
| G01C 21/36 | (2006.01) | |
| G01C 21/34 | (2006.01) | |
| G08G 1/0967 | (2006.01) | |
| G08G 1/0968 | (2006.01) | |
| G08G 1/0969 | (2006.01) | |

(52) U.S. Cl.
CPC ..... G01C 21/3694 (2013.01); G01C 21/3469 (2013.01); G01C 21/3492 (2013.01); G01C 21/3676 (2013.01); G08G 1/0967 (2013.01); G08G 1/0969 (2013.01); G08G 1/096805 (2013.01)

(58) Field of Classification Search
CPC ............ G01C 21/3694; G01C 21/3469; G01C 21/3492; G01C 21/3676; G08G 1/0967; G08G 1/096805; G08G 1/0969
See application file for complete search history.

(56) References Cited

U.S. PATENT DOCUMENTS

| | | | |
|---|---|---|---|
| 6,038,509 A | * | 3/2000 | Poppen |
| 7,193,528 B2 | | 3/2007 | Hanebrink |
| 7,617,041 B2 | | 11/2009 | Sera |
| 8,615,354 B2 | | 12/2013 | Barker et al. |

(Continued)

FOREIGN PATENT DOCUMENTS

| | | |
|---|---|---|
| JP | H05120597 A | 5/1993 |
| JP | H0875488 A | 3/1996 |

OTHER PUBLICATIONS

Chen, W. et al., "A Survey of Traffic Data Visualization" IEEE Transactions on Intelligent Transportation Systems (Dec. 2015) pp. 2970-2984, vol. 16, No. 6.

(Continued)

*Primary Examiner* — Courtney D Heinle
(74) *Attorney, Agent, or Firm* — Tutunjian & Bitetto, P.C.; Vazken Alexanian (57) ABSTRACT

A computer-implemented method and system for providing unidirectional traffic flow distributions. The method includes generating a directed graph representing a position of a vehicle and a road network within a predetermined distance of the position of the vehicle, wherein vertices represent decision points along an edge and edges represent route segments between adjacent vertices, determining a plurality of travel routes within the directed graph by estimating a shortest path and at least one index for each edge in the directed graph, wherein each travel route includes one or more edges, selecting a travel route from the plurality of travel routes, and outputting unidirectional traffic information for edges included along the travel route.

20 Claims, 5 Drawing Sheets

(56) References Cited

U.S. PATENT DOCUMENTS

2005/0162284 A1\* 7/2005 Hanebrink
2007/0118281 A1   5/2007 Adam et al.
2008/0215233 A1   9/2008 Kdachi

OTHER PUBLICATIONS

Qi, L. et al., "Trafforithm—A Traffic-aware Shortest Path Algorithm in Real Road Networks with Traffic Influence Factors" Proceedings of the 1st International Conference on Geographical Information Systems Theory, Applications and Management (GISTAM-2015) (Apr. 2015) pp. 105-112.

\* cited by examiner

VISUALIZING UNIDIRECTIONAL TRAFFIC INFORMATION

BACKGROUND

Technical Field

The present invention relates generally to providing traffic flow distributions and, in particular, to methods and systems for providing unidirectional traffic flow distributions.

Description of the Related Art

Navigation systems aid users (e.g., drivers) in the navigation of roadways, especially in certain situations (e.g., traffic congestion). Conventional navigation systems may be entirely on board a vehicle, or they may be located remotely and communicate with a vehicle to provide navigation guidance. Some navigation systems may provide information related to traffic conditions to a user, such as estimated time for a particular route and/or cause of traffic conditions (e.g., accident, construction, closed roadways, etc.), and some systems may even suggest alternative routes.

Such systems display traffic information that is often confusing to the driver, thereby making it difficult for drivers to interpret this information while driving. For example, some systems provide multiple traffic conditions heading in multiple directions, such as both directions of a bidirectional roadway, making it difficult for a driver to distinguish which traffic condition corresponds with their intended direction. In addition, some systems display traffic conditions using color coordinated markings; however, these markings are displayed for traffic heading in both directions of a bidirectional roadway.

SUMMARY

In accordance with an embodiment of the present invention, a computer-implemented method for providing unidirectional traffic flow distributions is provided. The computer-implemented method includes generating a directed graph representing a position of a vehicle and a road network within a predetermined distance of the position of the vehicle, wherein vertices represent decision points along an edge and edges represent route segments between adjacent vertices, determining a plurality of travel routes within the directed graph by estimating a shortest path and at least one index for each edge in the directed graph, wherein each travel route includes one or more edges, selecting at least one travel route from the plurality of travel routes, and outputting unidirectional traffic information for edges included along the at least one travel route.

In accordance with an embodiment of the present invention, a traffic information system having at least a processor and a memory device for providing unidirectional traffic flow distributions is provided. The traffic information system includes a map generator to generate a directed graph representing a position of a vehicle and a road network within a predetermined distance of the position of the vehicle, wherein vertices represent decision points along an edge and edges represent route segments between adjacent vertices, a travel direction estimation unit to determine a plurality of travel routes within the directed graph by estimating a shortest path and at least one index for each edge in the directed graph, and select at least one travel route from the plurality of travel routes, wherein each travel route includes one or more edges, and a display unit to display unidirectional traffic information for edges included along the at least one travel route.

In accordance with an embodiment of the present invention, a non-transitory computer readable storage medium comprising a computer readable program for providing unidirectional traffic flow distributions is provided. The computer readable program, when executed on a computer, causes the computer to execute generating a directed graph representing a position of a vehicle and a road network within a predetermined distance of the position of the vehicle, wherein vertices represent decision points along an edge and edges represent route segments between adjacent vertices, determining a plurality of travel routes within the directed graph by estimating a shortest path and at least one index for each edge in the directed graph, wherein each travel route includes one or more edges, selecting at least one travel route from the plurality of travel routes, and outputting unidirectional traffic information for edges included along the at least one travel route.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The following description will provide details of preferred embodiments with reference to the following figures wherein.

DETAILED DESCRIPTION

Systems and methods for providing unidirectional traffic flow distributions are provided. Embodiments of the present invention are directed to providing traffic flow distributions in a direction that a user (e.g., driver) intends to or will likely travel. In one embodiment, the systems and methods determine a present position of the driver's vehicle in real-time on a map and provide the user with unidirectional traffic flow information along a route segment a user is likely to travel based on a shortest path and one or more indices for each path.

In some embodiments, the user can preselect a desired destination and one or more routes to a desired destination can be generated based on shortest distance to travel (e.g., shortest path), gasoline consumption values, cost factors (e.g., tolls), accumulated wait time due to traffic signals, etc., or a combination thereof. In useful embodiments, the systems and methods provided herein provide traffic information along the one or more route segments in a single direction. Accordingly, traffic information understandable to drivers is provided without dropping any information (e.g., traffic information associated with routes on which the driver may travel) for self-routing by drivers. Thus, traffic information associated with road segments that are not on the shortest path can be kept (e.g., not dropped) if such information can be useful to the driver.

It should be noted that the term "dropped" means "information that is not provided" to a driver. For example, assume there are two routes from points A to B, namely A-C-B and A-D-B. Further assume that when navigation specified to a destination point B is computed, the shortest path can be A-C-B. In this case, typical conventional navigation systems show traffic information for only A-C-B (e.g., the shortest path), and traffic information for route A-D-B is not shown at all. The present invention avoids the dropping of such information so that, for example, a driver may use such information for self-navigation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1:
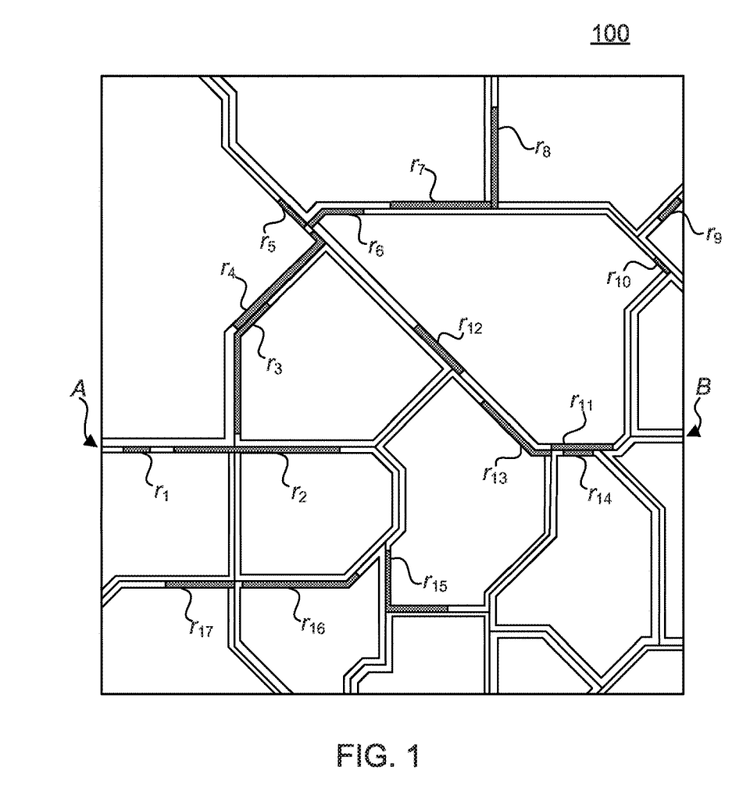
FIG. 1 is a schematic diagram showing an exemplary system/method for providing traffic flow distributions.

Referring to the drawings in which like numerals represent the same or similar elements and initially to FIG. 1, a system 100 for providing traffic information on a map is illustratively depicted. System 100 provides a user (e.g., driver) with traffic information related to multiple routes (e.g., $r_1$-$r_{17}$) in a surrounding area. However, displaying all traffic information to a user can be confusing to the driver and/or make it difficult for the driver to interpret such information, especially while driving and paying attention to current events on the road (e.g., construction, traffic conditions, etc.). For example, the driver may not intend to and/or is not likely to travel routes $r_2$, $r_8$, $r_9$, $r_{12}$, etc., however, such extraneous traffic information corresponding to routes $r_2$, $r_8$, $r_9$, $r_{12}$, etc. are still displayed to a user using conventional systems.

As shown in FIG. 1, some conventional systems 100 provide traffic conditions heading in multiple (e.g., bidirectional) directions of a bidirectional roadway, even when the driver is traveling and/or intends to travel along a single direction. For example, traffic information is displayed for route $r_3$, which has traffic heading north/northeast, and for route $r_4$, which has traffic heading southwest. Thus, a driver needs to interpret which route (e.g., $r_3$ or $r_4$) pertains to the driver in relation to his/her current position A and/or driving destination B, which can be distracting while driving and/or lead to accidents, congestion, etc.

Figure 2:
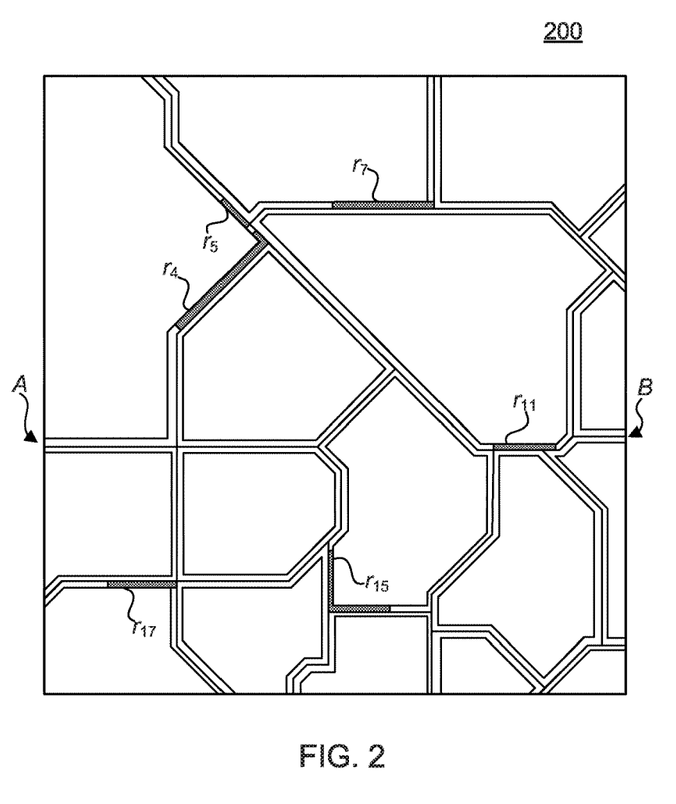
FIG. 2 is a schematic diagram showing an exemplary system/method for providing unidirectional traffic flow distributions, in accordance with an embodiment of the present invention.

Now referring to FIG. 2, a system 200 for providing unidirectional traffic flow distributions on a map is illustratively depicted in accordance with an embodiment of the present invention. As shown in FIG. 2, the system 200 determines and/or estimates a reasonable/inferred traveling direction of the driver (e.g., a travel route) from a current position A, as will be described in further detail below. For example, the reasonable/inferred traveling direction is based on a shortest path (e.g., a physical distance between one or more edges) and one or more indices (e.g., shortest travel time, etc.). In some embodiments, the reasonable/inferred traveling direction is determined using a driving destination B, as will be described in further detail below.

The system 200 generates a directed graph corresponding to the road network within a predetermined distance of the position of the vehicle. A directed graph is a set of vertices/nodes connected by edges where nodes represent one or more decision points, such as starting points, current location of the driver, an intersection, a junction, a landmark and/or destination points. For example, a decision point can include a location where the driver has to make a decision whether or not to turn left, right, or continue forward. The edges in the directed graph can correspond to a road segment between nodes and having one or more directions associated with each road segment.

In one embodiment, the edges include one or more indices having information associated with each edge corresponding to adjacent nodes. For example, indices include a travel time associated with the edge (e.g., estimated time of arrival, shortest travel time, etc.), gasoline consumption values, accumulated waiting time due to traffic signals, etc. In some embodiments, the index of an edge corresponds to an approximated amount of time it may take a driver to travel the particular road segment (e.g., edge). In one embodiment, the index can be representative of an approximate amount of gasoline that may be consumed to travel that particular edge, which may be important if the driver wishes to conserve gasoline.

The system 200 determines a plurality of travel routes and selects a reasonable/inferred traveling direction of the user/vehicle based on the shortest distance and at least one index, and provides only those routes to the user. For example, only relevant road segments are displayed and/or communicated to the driver. Thus, the user is only provided with traffic information heading in the intended direction of the user (e.g., unidirectional). As clearly shown in FIG. 2, routes $r_1$-$r_3$, $r_6$, $r_8$-$r_{10}$, $r_{12}$-$r_{14}$, and $r_{16}$, have been removed and/or "filtered out" such that the driver is not confused with routes that are irrelevant to the driver. Instead, only routes $r_4$, $r_5$, $r_7$, $r_{11}$, $r_{15}$ and $r_{17}$ are provided/outputted to the user.

Figure 3:
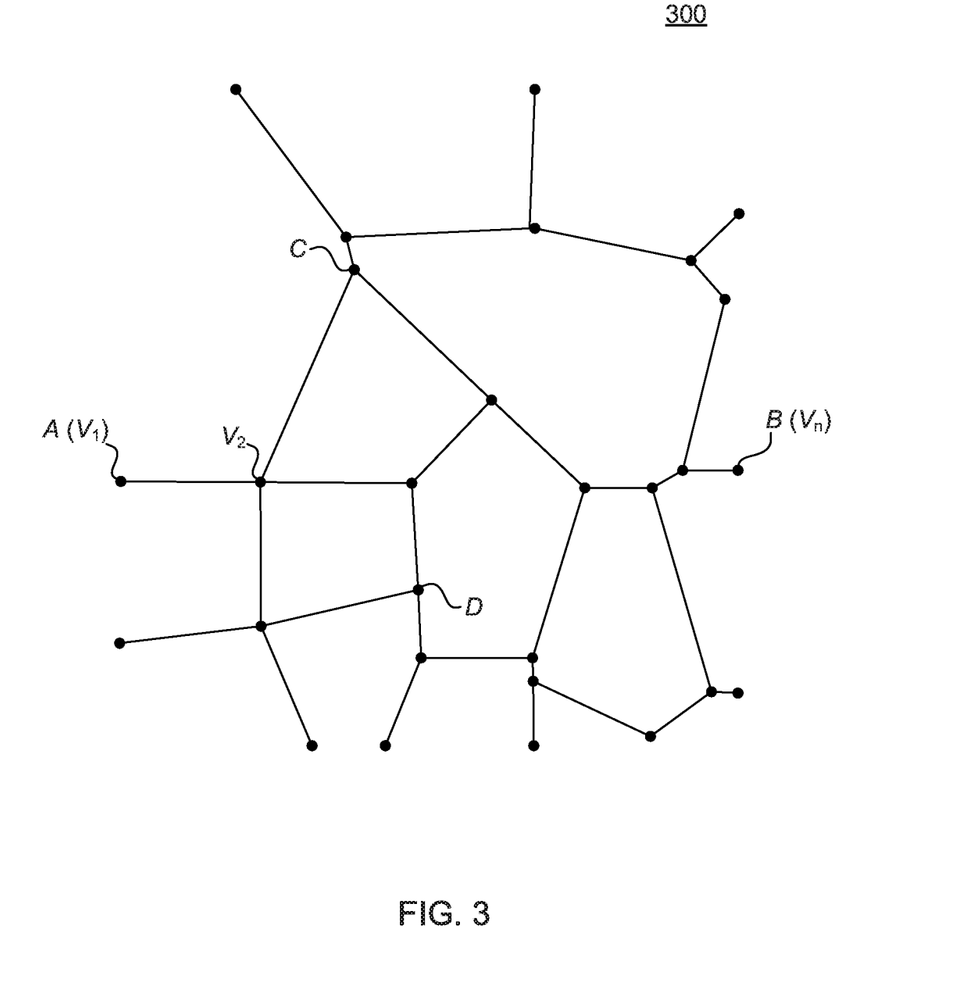
FIG. 3 is a schematic diagram showing an exemplary directed graph corresponding to the diagram of FIG. 2, in accordance with an embodiment of the present invention.

Now referring to FIG. 3, an exemplary directed graph 300 corresponding to the map for system 200 is shown for illustrative purposes. As described above, the system 200 generates a directed graph representing a position of a vehicle and/or a road network. The vertices $V_1, V_2, \ldots, V_n$ can be representative of decision points along each edge.

Each edge (e.g., road segment) connects at least two vertices (e.g., adjacent vertices). In an illustrative embodiment, vertex $V_1$ (e.g., A) can correspond with an initial position of a vehicle, and vertex $V_n$ (e.g., B) can correspond with an intended/known destination. Vertices C and D correspond to decision points within the directed graph.

In one embodiment, each edge is associated with one or more indices. For example, the edge between vertices $V_1$ and $V_2$ can be associated with one or more indices, such as estimated distance between vertices $V_1$ and $V_2$, estimated travel time from vertex $V_1$ to vertex $V_2$, approximated gasoline consumption between vertices $V_1$ and $V_2$, accumulated waiting time between vertices $V_1$ and $V_2$, etc. Embodiments of the present invention determine a shortest path (e.g., physical distance) for each edge between each adjacent vertex and one or more indices for each edge to determine a plurality of travel routes and select at least one travel route (e.g., an inferred traveling direction of the driver/vehicle).

Figure 4:
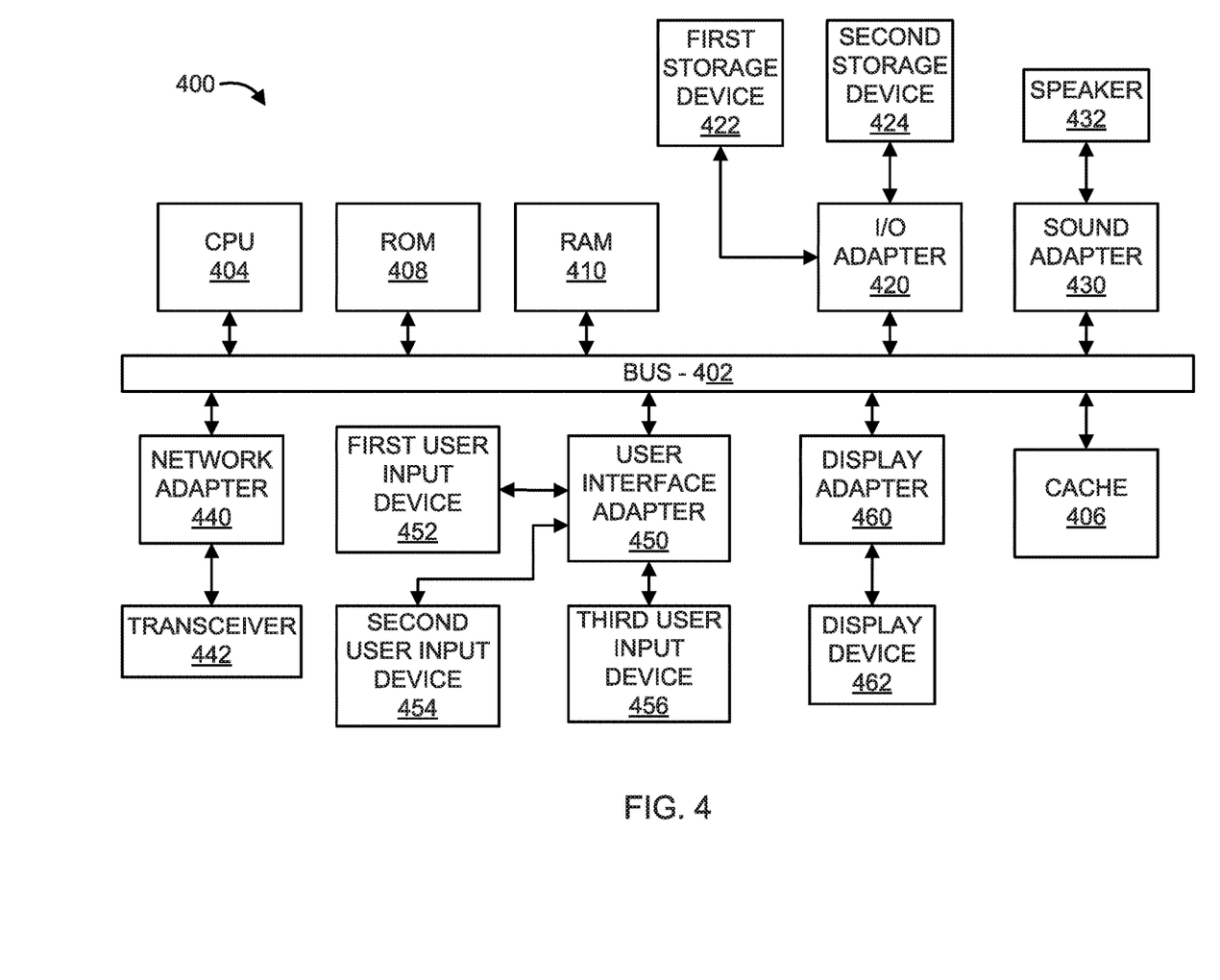
FIG. 4 is a block/flow diagram showing an exemplary processing system/method for providing unidirectional traffic flow distributions, in accordance with an embodiment of the present invention.

Referring now to FIG. 4, an exemplary system 400 for implementing respective embodiments of the present invention is illustratively depicted. Part or all of processing system 400 can be implemented in one or more of the elements of system 500 of FIG. 5. Further, it is to be appreciated that processing systems 200, 300, 400 and/or 500 can perform at least part of the method described herein including, for example, at least part of method 700 of FIG. 7.

The processing system 400 includes at least one processor, such as a computer processing unit (CPU) 404, operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460 are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, etc. The storage devices 422 and 424 can be the same type of storage device or different types of storage devices. In one embodiment, route information (e.g., roadway maps, road networks etc.), such as unidirectional/bidirectional roadways and/or traffic signals, may be stored on the first storage device 422 and/or the second storage device 424. In one embodiment, estimated distance for each edge may be stored on the first storage device 422 and/or the second storage device 424. Each edge is representative of a road segment from one junction (e.g., vertex) to another junction. In some embodiments, a single road segment corresponds to a single edge. In one embodiment, the first storage device 422 and/or the second storage device 424 stores a plurality of roadways in a road network as a directed graph where indices between each edge represent information related to the edge, such as estimated travel time, estimated distance, etc.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460. In one embodiment, unidirectional traffic flow distributions along an intended route can be displayed to a user by display device 462 and/or otherwise communicated to the driver via speaker 432.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Other types of input devices can also be used. The user input devices 452, 454, and 456 can be the same type of user input device or different types of user input devices. The user input devices 452, 454, and 456 can be employed to input and output information to and from system 400. For example, a user (e.g., driver) can input a desired destination via one or more input devices 452, 454, and 456 such that one or more routes to the desired destination may be generated.

The processing system 400 can also include other elements (not shown) or may omit some elements as shown. For example, various other input devices and/or output devices can be included in processing system 400, depending upon the particular implementation of the same. Moreover, additional processors, controllers, memories, and so forth, in various configurations can also be utilized.

Figure 5:
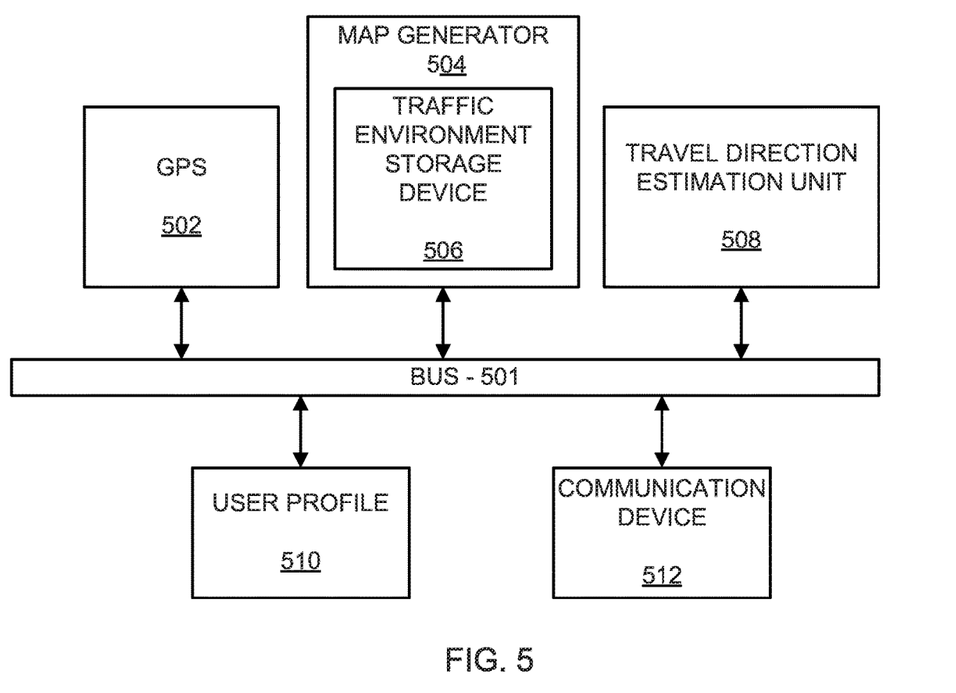
FIG. 5 is a block/flow diagram showing an exemplary system/method for providing unidirectional traffic flow distributions, in accordance with an embodiment of the present invention.

Moreover, it is to be appreciated that system 500 described below with respect to FIG. 5 is a system for implementing respective embodiments of the present invention. Part or all of processing system 400 may be implemented in one or more of the elements of system 500. Further, it is to be appreciated that processing system 500 can perform at least part of the method described herein including, for example, at least part of method 700 of FIG. 7.

Referring now to FIG. 5, with continued reference to FIGS. 1-4, an exemplary method/system 500 for providing unidirectional traffic flow distributions is shown, in accordance with an embodiment. The system 500 determines a position of a vehicle and a road network within a predetermined distance of the vehicle, which the system 500 represents as a directed graph. In some embodiments, the initial position and/or current position of the vehicle is known using global positioning system (GPS) coordinates from GPS 502 and the initial/current position can be used as a first node/vertex in the directed graph.

The system 500 estimates a likely traveling direction of the vehicle based on, for example, the shortest path information for each edge from the initial position and/or current position of the vehicle and one or more indices for each edge. For example, the system 500 determines a plurality of travel routes and selects at least one travel route based on shortest path information and at least one index. The index can include an estimated time of travel based on traffic information stored in traffic environment storage device 506, as will be described in further detail below. Based on such information, the system 500 generates/outputs unidirectional traffic information for edges included along the inferred traveling direction (e.g., the selected travel route).

It should be noted that indices are an arbitrary function from each vertex. Indices may include, for example, estimated passage time for each edge. The system 400 infers/estimates a traveling direction of the user by computing the indices for each edge and comparing each of the indices of the plurality of travel routes. Generally, "indices" are any number that can be compared to each other. It should further be understood that shortest path includes physical length of each edge.

The system 500 includes a global position system (GPS) 502, a map generator 504, a traffic environment storage device 506, a travel direction estimation unit 508, a user profile 510, and a communication device 512.

The global positing system (GPS) 502 determines a position of a vehicle and a road network within a predetermined distance of the position of the vehicle. For example, GPS 502 includes satellite components to provide one or more locations of a particular vehicle, such as an initial position and/or one or more successive positions of the vehicle. The GPS 502 can periodically update the vehicle's position at predetermined intervals, such as various time intervals (e.g., seconds). In addition, the GPS 502 provides coordinates and/or a map of one or more roads/routes (e.g., road segments) forming a road network. Each road/route segment represents one or more edges between two adjacent vertices, wherein the vertices represent decision points along the edge (e.g., starting points, current location of the driver, an intersection, a junction, a landmark and/or destination points, etc.).

In some embodiments, each road segment includes a single direction (e.g., unidirectional) and/or two directions (e.g., bidirectional). For example, a road can include one edge traveling along a first direction and a second edge traveling along a second direction, the first direction being opposite the second direction. In one embodiment, the GPS 502 provides a road network within a predetermined distance of the vehicle's position. For example, the GPS 502 determines roads that are within a ten mile radius of the vehicle's position, however other distances are readily contemplated.

The map generator 504 generates a directed graph of the road network, such as that depicted in FIG. 3, wherein the directed graph represents the position of vehicle, the road network, and/or various edges connecting one or more vertices. For example, vertices include physical locations of decision points (e.g., starting points of the vehicle, current location of the vehicle, an intersection, a junction, a landmark and/or destination points). In addition, edges between adjacent vertices can represent one or more routes or road segments between adjacent vertices. As described above, a route between adjacent vertices can include one edge in a single direction. In some embodiments, the route between adjacent vertices includes two edges, the two edges including a first edge in a first direction and a second edge in a second direction, the first direction being opposite of the second direction.

In some embodiments, the map generator 504 includes a traffic environment storage device 506. The traffic environment storage device 506 stores general information regarding a road network. For example, the traffic environment storage device 506 includes information associated with traffic signals (e.g., stop lights, stop signs, yield signs, etc.), general traffic information (e.g., traveling direction(s) of each road) and/or traffic restrictions (e.g., speed limits, speed bumps). In some embodiments, such information may be represented on the directed graph as one or more vertices.

The travel direction estimation unit 508 estimates an inferred traveling direction of the vehicle. Specifically, the travel direction estimation unit 508 determines a plurality of travel routes within the directed graph by estimating a shortest path and at least one index for each edge in the directed graph, and selects at least one travel route from the plurality of travel routes as the inferred traveling direction.

For example, the travel direction estimation unit 508 determines the shortest path between each vertex (e.g., for each edge) and at least one index for each edge within the road network. The shortest path includes the shortest distance to travel each edge. For example, the shortest path includes a physical distance between an initial vertex and a subsequent vertex. When the initial/current position of the vehicle is known, the initial/current position of the vehicle can be used as the initial vertex. The subsequent vertex can include, for example, the next junction, the final destination (if known) of the vehicle, etc.

In some embodiments, the travel direction estimation unit 508 determines the shortest path using Dijkstra's algorithm, however other algorithms are readily contemplated. Dijkstra's algorithm is an algorithm for finding the shortest path between nodes in a graph which represent, for example, road networks. For a given source node in the directed graph, the algorithm determines the shortest path between the given source node and every other node.

For example, the travel direction estimation unit 508 determines approximated distances for each edge within the road network and selects only those edges with the shortest distance. The travel direction estimation unit 508 can employ a shortest path algorithm to determine a travel distance for each edge. In some embodiments, the shortest path algorithm can be computed between two given locations/positions (e.g., start position, end position, etc.) in a road network to provide a route that includes a minimum distance between the two positions. For example, a driver may be inclined to travel along edges that have the least amount of miles.

In useful embodiments, the travel direction estimation unit 508 determines at least one index for each edge within the directed graph. The at least one index can be selected from the group consisting of shortest travel time, gasoline consumption values, travel cost, and accumulated waiting time due to traffic signals. In some embodiments, the travel estimation unit 508 accesses/receives information from the traffic environment storage device 506, such as traffic information for any given edge within the road network.

The travel direction estimation unit 508 calculates/determines an index for each edge of the directed graph to select the inferred traveling direction of the vehicle. In some examples, a driver may be inclined to travel along routes that have the least amount of traffic signals for better fuel economy. In other examples, a driver may be inclined to travel along routes that exhibit the least amount of travel time between vertices (e.g., junctions). Accordingly, the travel direction estimation unit 508 determines at least one index for each edge. In a further embodiment, the travel direction estimation unit 508 estimates the inferred traveling direction of the vehicle based on the shortest path and at least one index factor for each edge. For example, the inferred traveling direction of the vehicle includes the route segment having the shortest path and the least amount of traveling time.

In some embodiments, the at least one index includes context factors stored in a user profile 510. The user profile 510 and/or context factors can be employed to estimate the inferred traveling direction of the vehicle by determining a likelihood to travel a particular direction based on one or more variables, such as time of day, day of week, previously traveled routes, a preselected destination, etc. For example, a vehicle may be more likely to travel along a certain route at lunchtime to locations that have a plurality of food facilities (e.g., restaurants, grocery stores, etc.). In another example, a vehicle may be more likely to travel towards a home, apartment, etc. after normal working hours during a weekday have concluded. In yet another example, a vehicle may be more likely to travel along a certain route after entering a particular destination location. Accordingly, such context factors and/or variables can be stored in a user profile database 510 accessible by the travel direction estimation unit 508 to further estimate the inferred traveling direction of the vehicle.

In one embodiment, the travel direction estimation unit 508 estimates the inferred traveling direction of the vehicle by determining an initial traveling direction of the vehicle. The travel direction estimation unit 508 can estimate the inferred traveling direction of the vehicle by comparing at least two successive positions of the vehicle. For example, the travel direction estimation unit 508 can compare a first position of the vehicle via GPS 502 with a second position of the vehicle via GPS 502 to determine which direction (e.g., North, South, East, West, etc.) the vehicle is traveling in. If the vehicle's second position is east of the vehicle's first position, for example, the travel direction estimation unit 508 estimates the inferred traveling direction as a route traveling eastbound.

The system 500 includes a communication device 512 to communicate the unidirectional traffic information for each edge along the inferred traveling direction (e.g., selected travel route). For example, the communication device 512 includes a display device to visually display the unidirectional traffic information to a user (e.g., driver) while driving. In some embodiments, the communication device 512 includes a speaker to audibly communicate the unidirectional traffic information to the user. The unidirectional traffic information can include an estimated amount of time to travel each route/edge. In one embodiment, the communication device 512 can remove/exclude traffic information for non-selected travel routes. Advantageously, only routes/edges along the inferred traveling direction can be communicated (e.g., displayed) so as to not confuse the user by providing irrelevant and/or extraneous traffic information.

In the embodiment shown in FIG. 5, the elements thereof are interconnected by a bus 501. However, in other embodiments, other types of connections can also be used. Moreover, in an embodiment, at least one of the elements of system 500 is processor-based. Further, while one or more elements may be shown as separate elements, in other embodiments, these elements can be combined as one element. These and other variations of the elements of system 500 are contemplated.

Figure 6:
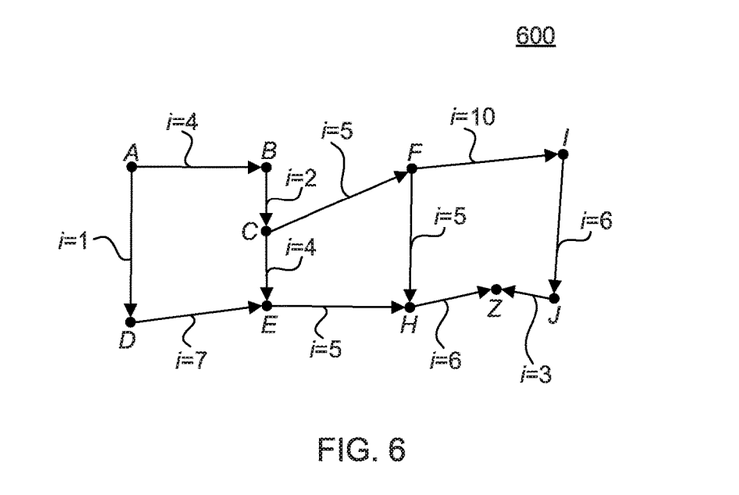
FIG. 6 is a schematic diagram showing an exemplary system/method for providing unidirectional traffic flow distributions, in accordance with an embodiment of the present invention.

Referring to FIG. 6, with continued reference to FIG. 5, an illustrative embodiment of the present invention is described for exemplary purposes. FIG. 6 shows a directed graph 600 of a road network generated by map generator 504. The vertices A, B, C, D, E, F, H, I, J and Z represent different decision points. For example, vertex A represents an initial/starting point, and vertex Z represents a destination point. Each edge between vertices corresponds to at least one index i. For illustrative purposes, the indices shown in FIG. 6 correspond to estimated traveling time (in minutes) between vertices. For example, edge A→D takes 1 minute to travel. Further assume that each vertex is separated from an adjacent vertex by a distance (e.g. shortest distance). Accordingly, the shortest global path (e.g., distance based only) from A to Z would include the travel route corresponding to A→D→E→H→Z (e.g., a total of 19 minutes).

The following illustrative example is provided to show processes performed by the travel direction estimation unit 508. The travel direction estimation unit 508 determines, for each node, the shortest path and at least one index (herein defined as estimated travel time) from the initial position A. The shortest paths are represented by the arrows, and the estimated traveling times (indices) for each edge are shown as i=1, 4, 10, etc. In an embodiment, the travel direction estimation unit 508 determines a plurality of travel routes, such as, for example, (1) A→B→C→E→H→Z, and (2) A→D→E→C→F→H→Z, both of which include the route segment either from C→E or E→C.

The travel direction estimation unit 508 selects at least one travel route from the plurality of travel routes. For example, the travel direction estimation unit 508 selects the travel route based on the shortest path and the indices of the edges along the respective travel route. In FIG. 6, the travel direction estimation unit 508 compares the combined indices from travel routes (1) A→B→C→E→H→Z, and (2) A→D→E→C→F→H→Z. For example, the total time to travel route (1) A→B→C→E→H→Z is 21 minutes, and the total time to travel route (2) A→D→E→C→F→H→Z is 28 minutes. For example, A→B→C (i=4+2), C→E (i=4), and E→H→Z (i=5+6) for a total of 21 minutes, and A→D→E (i=1+7), E→C (i=4), and C→F→H→Z (i=5+5+6) for a total of 28 minutes. Thus, traveling along a route that includes road segment E→C, rather than C→E, results in a 7 minute time difference.

If the shortest path and the amount of travel time for path (1) is less than path (2), the travel direction estimation unit 508 estimates the inferred traveling direction of the vehicle as C→E. The unidirectional traffic information for edges (e.g., path (1)) along the inferred traveling direction cab be communicated/output to the vehicle/driver via communication interface 512. Accordingly, the travel direction estimation unit 508 selects the travel route including segment C→E by comparing a combination of one or more indices between at least two travel routes, and only traffic information for the inferred traveling direction is generated and/or output to the driver/vehicle.

The following description summarizes the processes performed at the travel direction estimation unit 508:

1. If the destination node (e.g., node Z) is known, proceed to step 4.
2. For each edge, compute shortest path and at least one index (e.g., travel time) from initial node (e.g., starting node) to a destination node. Proceed to step 3.
3. For each edge, determine the inferred traveling direction and output traffic information corresponding to the inferred traveling direction. End.
4. Assume the initial node A and the destination node Z is known. In addition, assume the nodes C and E correspond to vertices between nodes A and Z. Proceed to step 5.
5. For each edge, determine shortest paths and reaching times of paths (1) A→B→C→E→H→Z, and (2) A→D→E→C→F→H→Z. If the shortest path and travel time of path (1) is less than that of path (2), output inferred traveling direction as C→E. Otherwise output as E→C. Output traffic information corresponding to the inferred traveling direction. End.

In some embodiments, a color can be displayed corresponding to the indices for each edge. For example, road segments that are traveling slower can be displayed in red, whereas road segments that are traveling faster can be displayed in green. Because only those road segments in which the driver in likely to travel are displayed, display of extraneous information that may cause confusion is avoided.

Figure 7:
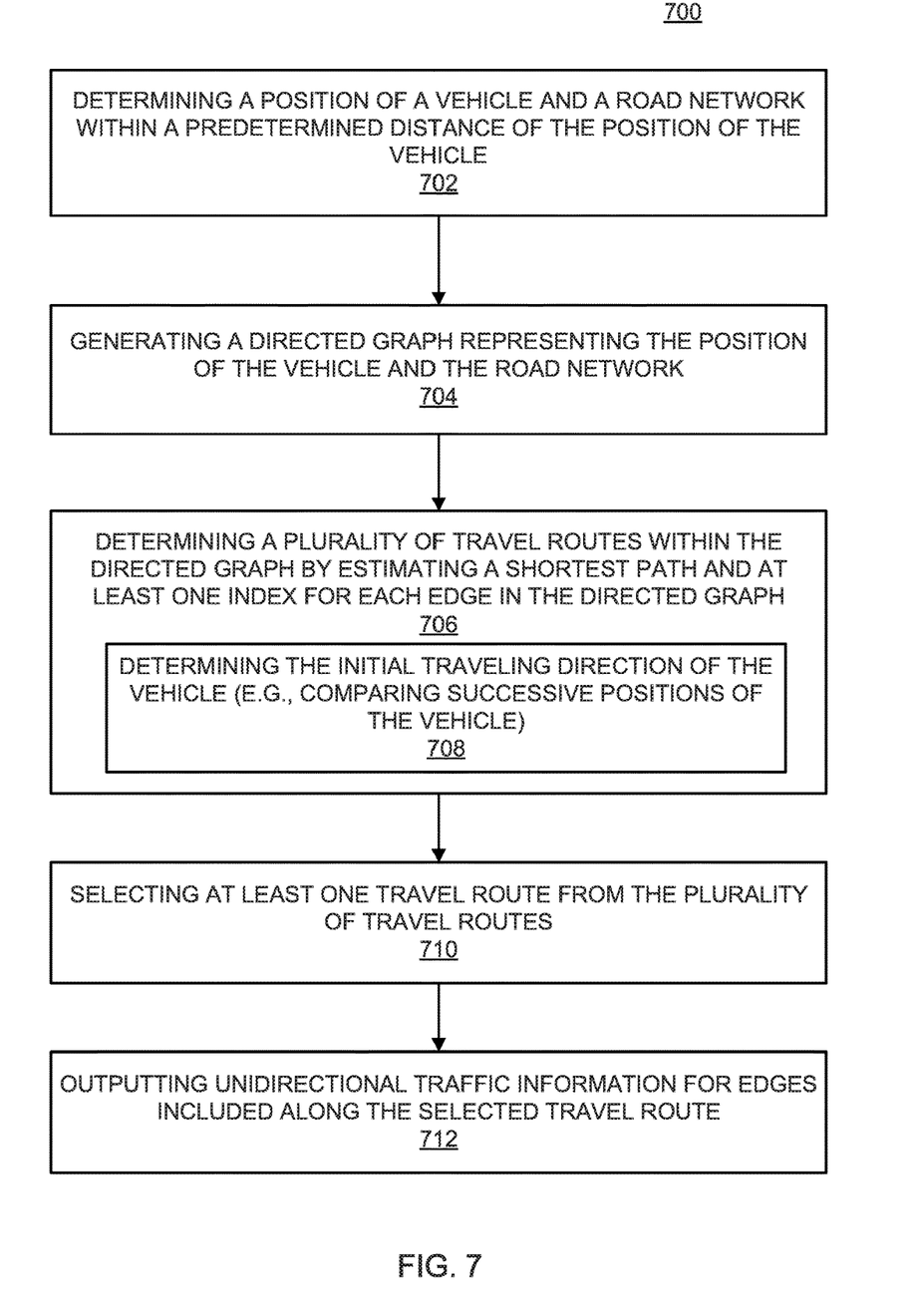
FIG. 7 is a block/flow diagram showing an exemplary system/method for providing unidirectional traffic flow distributions, in accordance with an embodiment of the present invention.

Now referring to FIG. 7, an exemplary method 700 for providing unidirectional traffic flow distributions is illustratively depicted, in accordance with an embodiment of the present invention.

In block 702, the method 700 includes determining a position of a vehicle and a road network within a predetermined distance of the position of the vehicle. The position of the vehicle can include coordinates of the vehicle on a map, such as the road network. In some embodiments, the road network within the predetermined distance includes roads/routes within a ten mile radius of the vehicle, however other distances are readily contemplated and can be preselected by the user. The position of the vehicle and the road network is represented as a directed graph, as shown in block 704. The edges between and/or connecting adjacent vertices represent a route and/or road segment. In some embodiments, the route includes one edge in a single direction. In some embodiments, the route includes two edges, the two edges including a first edge in a first direction and a second edge in a second direction, wherein the first direction is opposite of the second direction.

In block 706, the method 700 includes determining a plurality of travel routes within the directed graph by estimating a shortest path and at least one index for each edge in the directed graph, wherein each travel route includes one or more edges. The at least one index includes, for example, shortest travel time, gasoline consumption, and/or waiting time due to traffic signals.

In some embodiments, the at least one index includes context factors of a user profile. The context factors can be used to determine a likelihood to travel a particular direction based on one or more variables, such as time of day, day of week, previously traveled routes, a preselected destination, or a combination thereof. In some embodiments, estimating the inferred traveling direction of the vehicle includes determining an initial traveling direction of the vehicle by comparing at least two successive positions of the vehicle, as illustrated in block 708.

In block 710, the method 700 selects at least one travel route from the plurality of travel routes. For example, selecting the at least one travel route includes comparing a combination of one or more indices between at least two travel routes. Traffic information for non-selected travel routes can be excluded, suppressed, and/or otherwise removed.

Unidirectional traffic information for edges included along the selected travel route can be generated and/or output, as shown in block 712. Outputting the unidirectional traffic information may include displaying the unidirectional traffic information on a display device and/or communicating the unidirectional traffic information via a speaker. Accordingly, the present invention provides traffic flow distributions in an inferred direction of the user such that the traffic information is understandable to drivers and irrelevant information is excluded.

Having described preferred embodiments of a system and method for providing unidirectional traffic flow distributions (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for providing unidirectional traffic flow distributions, comprising:
   generating a directed graph representing a position of a vehicle and a road network within a predetermined distance of the position of the vehicle, wherein vertices represent decision points along an edge, and edges represent route segments between adjacent vertices;
   determining a plurality of travel routes between the position of the vehicle and a destination within the directed graph by estimating a shortest path and at least one index for each edge in the directed graph, wherein each travel route includes one or more edges;
   selecting at least one travel route from the plurality of travel routes; and
   outputting, on a display device, unidirectional traffic congestion information on a roadmap corresponding to the directed graph, concurrently, for edges included along the plurality of travel routes in a direction of travel of the vehicle.

2. The method of claim 1, wherein each of the plurality of travel routes includes edges having a shortest combined path, the shortest combined path being a combination of each shortest path for each edge along a respective travel route.

3. The method of claim 1, wherein outputting the unidirectional traffic information includes excluding traffic information for non-selected travel routes.

4. The method of claim 1, wherein a route segment between adjacent vertices includes two edges, the two edges including a first edge in a first direction and a second edge in a second direction, the first direction being opposite of the second direction.

5. The method of claim 1, wherein selecting the at least one travel route includes comparing a combination of one or more indices between at least two travel routes.

6. The method of claim 1, wherein the at least one index is selected from the group consisting of shortest travel time, gasoline consumption value, and accumulated waiting time due to traffic signals.

7. The method of claim 1, wherein selecting the at least one travel route from the plurality of travel routes further comprises determining an initial traveling direction of the vehicle.

8. The method of claim 7, wherein determining the initial traveling direction of the vehicle includes comparing at least two successive positions of the vehicle.

9. A traffic information system having at least a processor and a memory device for providing unidirectional traffic flow distributions, comprising:
   a map generator to generate a directed graph representing a position of a vehicle and a road network within a predetermined distance of the position of the vehicle, wherein vertices represent decision points along an edge and edges represent route segments between adjacent vertices;
   a travel direction estimation unit to determine a plurality of travel routes between the position of the vehicle and a destination within the directed graph by estimating a shortest path and at least one index for each edge in the directed graph, and select at least one travel route from the plurality of travel routes, wherein each travel route includes one or more edges; and
   a display unit to display unidirectional traffic congestion information on a roadmap corresponding to the directed graph, concurrently, for edges included along the plurality of travel routes in a direction of travel of the vehicle.

10. The traffic information system of claim 9, wherein each of the plurality of travel routes includes edges having a shortest combined path, the shortest combined path being a combination of each shortest path for each edge along a respective travel route.

11. The traffic information system of claim 9, wherein the display unit further configured to exclude traffic information for non-selected travel routes.

12. The traffic information system of claim 9, wherein a route segment between adjacent vertices includes two edges, the two edges including a first edge in a first direction and a second edge in a second direction, the first direction being opposite of the second direction.

13. The traffic information system of claim 9, wherein the travel direction estimation unit selects the at least one travel route by comparing a combination of one or more indices between at least two travel routes.

14. The traffic information system of claim 9, wherein the at least one index is selected from the group consisting of shortest travel time, gasoline consumption value, and accumulated waiting time due to traffic signals.

15. The traffic information system of claim 9, wherein the travel direction estimation unit is further configured to select the at least one travel route by determining an initial traveling direction of the vehicle.

16. The traffic information system of claim 15, wherein determining the initial traveling direction of the vehicle includes comparing at least two successive positions of the vehicle.

17. A non-transitory computer readable storage medium comprising a computer readable program for providing unidirectional traffic flow distributions, wherein the computer readable program, when executed on a computer, causes the computer to execute:

generating a directed graph representing a position of a vehicle and a road network within a predetermined distance of the position of the vehicle, wherein vertices represent decision points along an edge and edges represent route segments between adjacent vertices;

determining a plurality of travel routes between the position of the vehicle and a destination within the directed graph by estimating a shortest path and at least one index for each edge in the directed graph, wherein each travel route includes one or more edges;

selecting at least one travel route from the plurality of travel routes; and outputting, on a display device, unidirectional traffic congestion information on a roadmap corresponding to the directed graph, concurrently, for edges included along the plurality of travel routes in a direction of travel of the vehicle.

18. The non-transitory computer readable storage medium of claim 17, wherein each of the plurality of travel routes includes edges having a shortest combined path, the shortest combined path being a combination of each shortest path for each edge along a respective travel route.

19. The non-transitory computer readable storage medium of claim 17, wherein selecting the at least one travel route includes comparing a combination of one or more indices between at least two travel routes.

20. The non-transitory computer readable storage medium of claim 17, wherein the at least one index is selected from the group consisting of shortest travel time, gasoline consumption value, and accumulated waiting time due to traffic signals.

* * * * *